United States Patent [19]

Alexander

[11] 4,392,967
[45] Jul. 12, 1983

[54] PROCESS FOR CONTINUOUSLY MANUFACTURING LUBRICATING GREASE

[75] Inventor: A. Gordon Alexander, Sarnia, Canada

[73] Assignee: Exxon Research and Engineering Co., Florham Park, N.J.

[21] Appl. No.: 291,944

[22] Filed: Aug. 11, 1981

[51] Int. Cl.³ .............................................. C10M 5/14
[52] U.S. Cl. ...................................... 252/41; 252/39; 366/88; 366/90; 366/322; 366/323
[58] Field of Search ...................... 252/41, 39; 366/84, 366/85, 88, 90, 322, 323

[56] References Cited

U.S. PATENT DOCUMENTS

| | | | |
|---|---|---|---|
| 2,332,202 | 10/1943 | Calkins | 252/39 |
| 2,374,913 | 5/1945 | Beerbower et al. | 252/39 |
| 2,383,906 | 8/1945 | Zimmer et al. | 252/39 |
| 3,475,335 | 10/1969 | Greene et al. | 252/39 |
| 3,475,337 | 10/1969 | Greene, Jr. et al. | 252/41 |
| 3,929,651 | 12/1975 | Murray et al. | 252/41 |
| 3,946,998 | 3/1976 | Menges et al. | 366/90 |
| 4,321,229 | 3/1982 | Blakeslee et al. | 366/90 |

OTHER PUBLICATIONS

C. J. Boner, "Modern Lubricating Greases", 1976, pp. 7.1–7.20.
W. B. Green et al., "Texaco's Continuous Grease Manufacturing Process", NLGI Spokesman, Oct., 1968, pp. 368–373.
A. C. Witte et al., "The Texaco Continuous Grease Process", NLGI Spokesman, Jul. 1980, pp. 133–136.

*Primary Examiner*—Jacqueline V. Howard
*Attorney, Agent, or Firm*—Eugene Zagarella

[57] ABSTRACT

A process for continuously manufacturing a lubricating grease using a screw process unit comprising:
(a) introducing feed materials and lubricating oil into selected locations of a screw process unit which contains a series of adjacent, longitudinally connected barrel sections for performing different operative steps and houses a rotating screw device traversing the interior of the barrel sections and having separate elements along its length to perform desired operations;
(b) mixing and conveying said feed materials along said process unit through the adjacent barrel sections by continuous operation of said rotating screw;
(c) controlling the temperature of said material while it is being conveyed through said process unit by use of various heat exchange means which are located in or adjacent each barrel to aid in carrying out the operative steps of dispersion, reaction, dehydration and/or homogenization;
(d) venting water resulting from the dehydration of the feed mixture at selected barrel discharge points in said process unit;
(e) introduction of additional lubricating oil and/or additives at downstream barrel locations following the dehydration step;
(f) homogenization of said complete grease formulation by continued rotation of said screw device; and
(g) removal of the finished lubricating grease from the end barrel section of said screw process unit.

19 Claims, 4 Drawing Figures

PROCESS FOR CONTINUOUSLY MANUFACTURING LUBRICATING GREASE

BACKGROUND OF THE INVENTION

This invention relates to an improved process for manufacturing a lubricating grease in a continuous operation using a screw process unit.

A wide variety of greases have been developed over the years comprising a number of different formulations and more important a wide variation in associated properties. The main ingredient found in greases is the thickening agent or gellant and differences in grease formulations have often involved this ingredient. Typical thickening agents or gellants used in lubricating greases include the alkali metal soaps, clays, polymers, asbestos, carbon black, silica gels and aluminum complexes. Soap thickened greases constitute the largest segment by far of the commercially available greases. Simple soap greases which are salts of long chain fatty acids and a neutralizing agent are probably the most predominant type of grease in use today with lithium 12-hydroxystearate being the thickener most often used. Complex soap greases which generally comprise metal salts of a mixture of organic acids have also come into widespread use, particularly because of the various property advantages such type greases can possess. In order to satisfy the many needs of the industry, mixed base greases consisting of mixtures of soaps of two different metals including complex soaps and mixtures containing one or more non-soap gellants have been developed. Such combinations have often led to the so-called "multi-purpose" greases which are generally defined as a grease that will perform satisfactorily in two or more applications normally requiring two or more different greases. Such multi-purpose greases are in wide use and more than 90% of the grease requirements of almost any operation can be satisfied with a single grease of such type.

Besides, the thickener or gellant, other properties and characteristics of a grease can be influenced by the particular lubricating base oil and the various additives that can be used.

In addition to the individual components which make up a grease formulation, another contributing factor to the final properties and characteristics of the grease is the particular process and the conditions under which it is manufactured. Thus, process conditions such as dispersing and mixing of materials and temperature variations can be significant factors effecting the resulting grease structure, e.g., the nature of soap crystallites and fibers formed.

Since there are a variety of different greases with varying formulations and properties and since such properties can be altered, sometimes significantly, by changes in process conditions and apparatus, a great deal of flexibility is needed in the process equipment for manufacturing greases. Because of the desired flexibility and because many greases are specialty type greases made in small amounts, most grease manufacturing has been of the batch type. Batch processing generally involves the use of large kettles, typically from 1,000 to 3,000 gallons or 10,000 to 30,000 pounds capacity, with paddle agitation. Heat transfer and mixing are generally poor and thus only one batch can normally be produced in a regular 8-hour shift and some types of grease require two or three shifts for completion.

Another type of batch processor sometimes used is a Stratco contractor which has a different internal mixing configuration. In this equipment, the material is circulated by an impeller located at the bottom of the vessel. Although the heat transfer characteristics are better than in the earlier described system, production time is still several hours and not all types of greases can be made in this equipment.

There have been several attempts to develop continuous or semi-continuous grease making technology. Probably the most successful of these approaches has been Texaco's continuous grease manufacturing process. The process involves metering starting materials into a pipe which carries the mass through a reactor section, dehydration section and a finishing section in a continuous manner with recycling of the grease mixture through a shear valve during the soap conditioning step. (See. U.S. Pat. Nos. 3,475,335 and 3,475,337 as well as NLGI Spokesman, XLIV, pp. 133-136, July 1980 and NLGI Spokesman XXXII, pp. 368-373, January 1969). While greases produced by this technique are reported to be equivalent in quality to kettle-manufactured greases, it cannot be used for many complex soap greases since there is no provision for downstream addition of secondary thickening components.

In addition to the above techniques, many other variations in the processing of grease and the equipment used in such processes have been tried as disclosed for example in "Modern Lubricating Greases" by C. J. Boner, Chapter 7, pages 7.1 to 7.20, 1976.

Despite the long history of grease formulations and the manufacture thereof, there still is the need for a continuous lubricating grease manufacturing method which will provide process, quality control, and economic advantages and most important will have the flexibility to be applicable for all grease types without significant changes in equipment being used.

SUMMARY OF THE INVENTION

It has now been discoverd that a process for continuously manufacturing lubricating grease using a screw process unit in accordance with this invention has particularly improved process, quality control and economic advantages and provides valuable flexibility in being useful for all grease types without significant equipment changes.

BRIEF DESCRIPTION OF THE DRAWINGS

The instant invention may be better understood by reference to the accompanying drawings wherein.

DETAILED DESCRIPTION OF THE INVENTION

Figure 1:
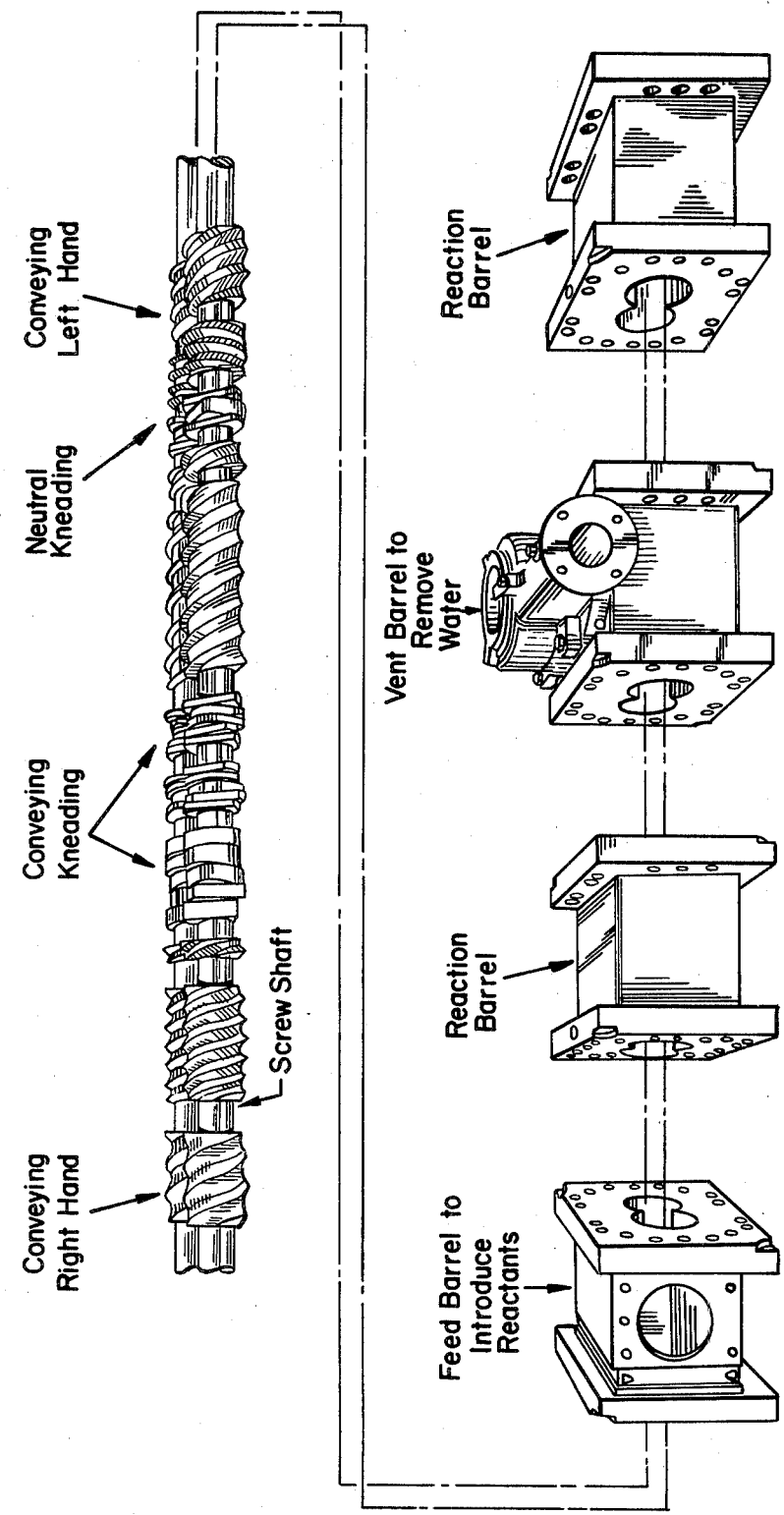
FIG. 1 illustrates a perspective view of the screw process unit used in the process of this invention.

This invention is directed to a process for continuously manufacturing a lubricating grease using a screw process unit. More particularly, the process of this invention comprises:

(a) introducing feed materials and lubricating oil into selected locations of a screw process unit which contains a series of adjacent, longitudinally connected barrel sections for performing different operative steps and houses a rotating screw device traversing the interior of the barrel sections and having separate elements along its length to perform desired operations;

(b) mixing and conveying said feed materials along said process unit through the adjacent barrel sections by continuous operation of said rotating screw;

(c) controlling the temperature of said material while it is being conveyed through said process unit by use of various heat exchange means which are located in or adjacent each barrel to aid in carrying out the operative steps of dispersion, reaction, dehydration and/or homogenization;

(d) venting water resulting from the dehydration of the feed mixture at selected barrel discharge points in said process unit;

(e) introduction of additional oil and/or additives at downstream barrel sections following the dehydration step;

(f) homogenization of said complete grease formulation by continued rotation of said screw device; and (g) removal of the finished lubricating grease from the end barrel section of said screw process unit.

A grease can be broadly and simply defined as a fine dispersion of a mostly oil insoluble thickening agent in a fluid lubricant. While the manufacture of a grease may, to the uninitiated, seem like a rather simple procedure of adding the proper ingredients and mixing, in actuality, grease manufacturing is not so simple. This is true because first of all the number of ingredients used can vary quite significantly and such different combinations will affect the properties of the formed grease. Thus, a number of different thickening agents or gellants can be used, different lubricating base oil and a host of additives such as oxidation inhibitors or anti-oxidants, rust preventives, extreme pressure agents, V.I. agents, pour depressants etc., and a combination or mixture of any number of such ingredients can be used. Besides the number of various ingredients which can be used in manufacturing greases there are several additional factors affecting the final properties of such greases most of which involve process considerations.

As noted earlier, greases are a dispersion of a gellant in a fluid lubricant and such gellants are formed either by in-situ reactions in the presence of lubricating fluids or by crystallization from hot dispersions in such liquids. This formation of grease gellants involves both crystal nucleation and growth. The actual formation of gellant crystallites is very important since the crystallite forms have a significant effect on the properties of the formed greases. No attempt will be made herein to go into a discussion of the formation of crystallites or how an optimum grease structure is formed except to say that generally the most effective use of a thickener in greases resides in having the smallest particles possible present and that usually, the lower the average temperature during processing of lubricating greases, the smaller the average particle size. Further details and information regarding the formation of greases and the structure of crystallites can be found in "Modern Lubricating Greases" by C. J. Boner, Chapter 3, pages 3.1 to 3.26, 1976.

In grease manufacturing, the number of steps will vary primarily with the gellant used. Also the variation may be due to the equipment available or the use of preformed ingredients. In a typical operation where soap formed in-situ is the thickener, the process steps will consist of (1) dispersion of the necessary saponifiable material in a portion of oil; (2) addition of the saponification agents, frequently dissolved or suspended in water; (3) heating to promote soap formation; (4) dehydration of the soap mass; (5) additional heating to complete soap dispersion; (6) crystallization of the soap melt; (7) cooling, frequently with further oil addition; (8) introduction of additives and (9) homogenization and/or milling.

While the grease forming process described above is directed to a so-called simple soap grease, it nevertheless involves a number of steps many of which are carried out at different temperatures and requires the addition and removal of different materials at different steps. Further complicating the process is that the mixing operations at each step may be different. The formation of a complex soap grease is even more complicated since it involves additional ingredients and generally a two-stage or multi-stage manufacturing technique to form the thickener.

The process of this invention which is illustrated in part in FIG. 1 allows for the continuous manufacture of any type of lubricating grease in a screw process unit. More particularly, the process of this invention is involved in the continuous manufacture of a grease wherein the thickener is formed in-situ, preferably a soap grease and more preferably a complex soap grease. As illustrated in FIG. 1, the process unit comprises a series of individual barrels which are adjacent to one another and longitudinally connected to allow for the different operative steps to be sequentially performed. Thus in the first barrel, called the feed barrel, feed material or reactants are introduced through an inlet opening. A screw element illustrated at the top of FIG. 1 as a twin screw, runs through the entire length of the series of barrels. Through the reaction of said screw elements by the use of a drive motor, the material is mixed and conveyed through the sequentially arranged barrels along the length of the screw process unit. The screw element may be a single screw or twin screw co- or counter-rotating configuration as illustrated in FIG. 1 with the twin screw and co-rotating configuration being preferred. What is of further significance in the flexibility of this operation in producing a variety of greases, is the configuration of screws. The screw configuration generally comprises separate and different elements as illustrated in FIG. 1. Such elements may be of different sizes, shapes, angles and configurations as shown by the different type elements in FIG. 1 and identified as conveying and kneading elements. This allows for the desired mixing, blending, conveying, etc. operations to be achieved along the length of the process unit by selection of the appropriate screw elements.

Figure 2:
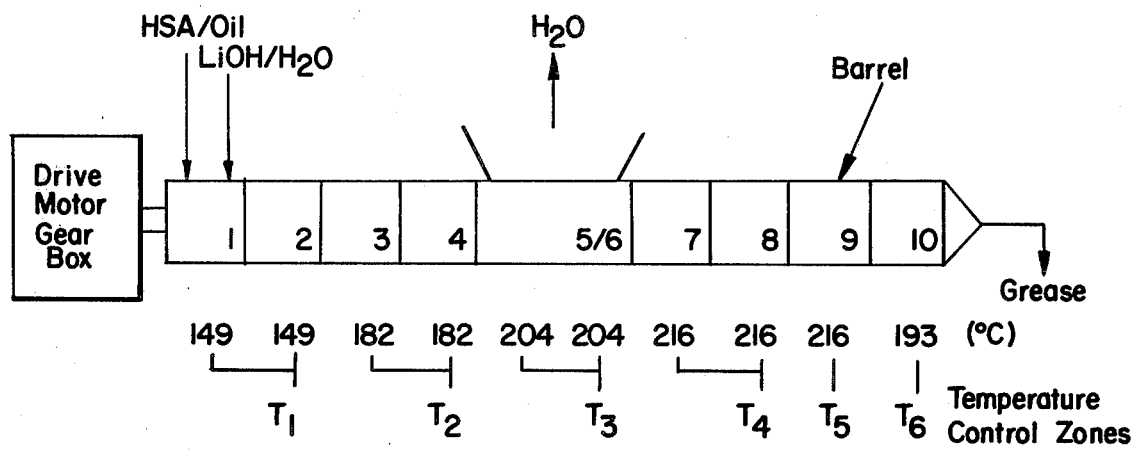
FIG. 2 is a schematic representation illustrating preparation of a simple lithium grease.
Figure 3:
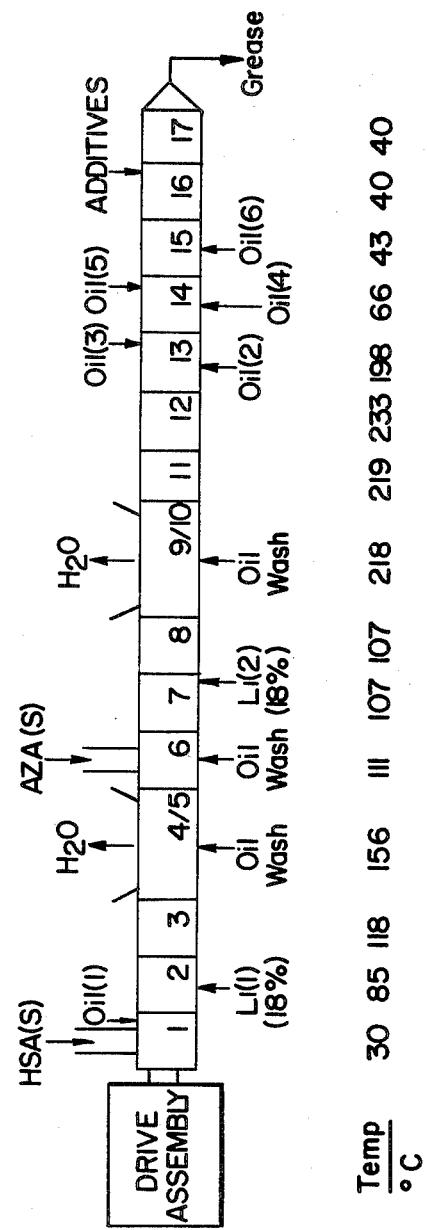
FIG. 3 is a schematic representation illustrating the two stage manufacture of a complex lithium grease.
Figure 4:
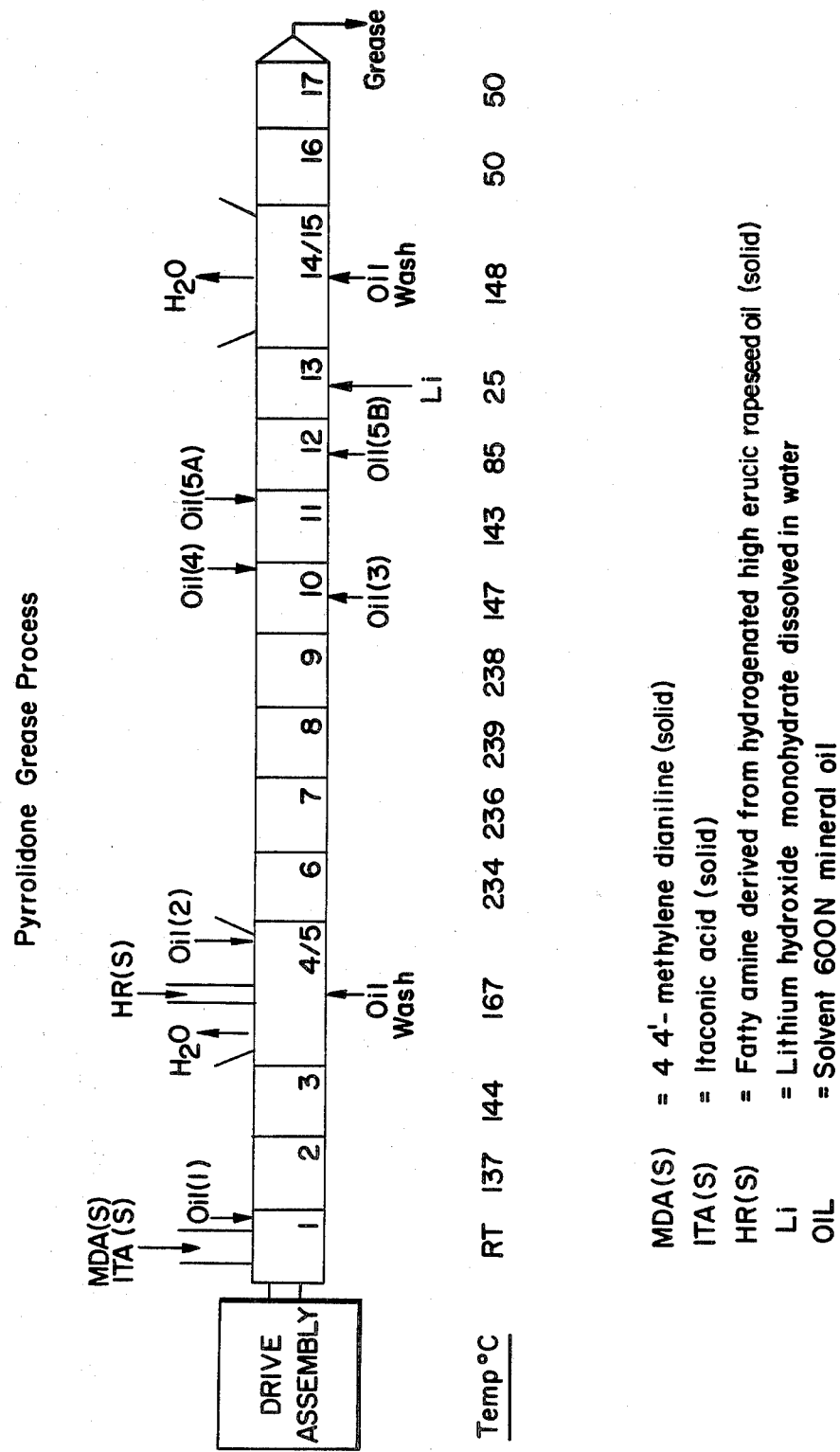
FIG. 4 is a schematic representation illustrating the multi-stage manufacture of a lithium pyrrolidone grease.

Along with the variation in the screw configuration and screw elements, the various barrels which are arranged along the length of the process unit have individual heat exchange means (not illustrated) which are located in or adjacent each barrel. This allows for the temperature in one or more barrels to be controlled in a so-called temperature control zone, to the desired operating conditions as illustrated in FIGS. 2, 3 and 4. The heat exchange means generally can comprise a passage such as a channel, chamber or bore in the barrel for carrying selected heat transfer media or can be an electrical heater such as calrod or coil type heaters. The heat exchange means generally are circumferentially located in or adjacent each barrel around the bore or central opening which houses the rotating screw device. Such means while preferably close to the central opening, may be placed around the exterior part of the individual barrels in a coil like manner e.g. insulated electrical heaters. Heat exchange means could also be placed in or along the shaft of the screw device. The preferred type of heat exchange means is a passage carrying heat transfer media. Any fluid may be used as the heat exchange medium such as water and petroleum oils and such selection will depend on the particular temperature desired and the ease of handling in the system. Further description of heat exchanger means and heat transfer media may be found in Kirk-Othmer, "Encyclopedia of Chemical Technology", Second edition, volume 10, pp. 819 to 862.

As illustrated in the drawings, the various barrels found in the screw process unit may have one or more inlet and outlet units to introduce or remove different materials. FIGS. 1, 2, 3, and 4 all disclose one or more vent barrels to remove water and FIG. 3 which illustrates the formation of a complex grease, also has barrels with inlets for additional reactant materials and oil. Additionally while not illustrated, other inlets for additives typically found in grease compositions may be provided.

The lubricating base oil that is used in preparing the grease composition in accordance with the method of this invention can be any of the conventionally used mineral oils, synthetic hydrocarbon oils or synthetic ester oils. Mineral lubricating oil base stocks can be any conventionally refined base stock derived from paraffinic, naphthenic and mixed base crudes. Synthetic lubricating oils that can be used include esters of dibasic acids, such as di-2-ethylhexyl sebacate, esters of polyglycols such as trimethyl propane tricaprylate, pentaerythritol tetraoctanoate, dipentaerythritol tricaprylate tripelargonate, esters of glycols such as $C_{13}$ oxo acid diester of tetrethylene glycol or complex esters such as one formed from 1 mole of sebacic acid and 2 moles of tetraethylene glycol and 2 moles of 2-ethylhexanoic acid. Other synthetic oils that can be used include synthetic hydrocarbons such as alkyl benzenes, e.g. alkylate bottoms from the alkylation of benzene with tetrapropylene or the copolymers of ethylene and propylene; silicon oils e.g. ethyl phenyl polysiloxanes, methyl polysiloxanes etc. polyglycol oils, e.g. those obtained by condensing butyl alcohol with propylene oxide; carbonate esters e.g. the product of reacting $C_8$ oxo alcohol with ethyl carbonate to form a half ester followed by reaction of the latter with tetraethylene glycol etc. Other suitable synthetic oils include the polyphenyl ethers, e.g. those having from about 3 to 7 ether linkages and 4 to 8 phenyl groups. Preferably the lubricating base oil will comprise the major amount of the grease composition.

Thickening agents or gellants are generally considered the main or most important ingredient in the grease formulation. Typically thickening agents used include the alkali metal soaps, clays, polymers, asbestos, carbon black, silica gels, polyureas and aluminum complexes. Soap thickened greases are the most popular with lithium and calcium soaps being most common. Simple soap greases are formed from the alkali metal salts of long chain fatty acids with lithium 12-hydroxystearate, the predominant one formed from 12-hydroxystearic acid, lithium hydroxide monohydrate and mineral oil. Complex soap greases are also in common use and comprise metal salts of a mixture of organic acids. One typical complex soap grease found in use today is a complex lithium soap grease prepared from 12-hydroxystearic acid, lithium hydroxide monohydrate, azelaic acid and mineral oil. The lithium soaps are described and exemplified in many patents including U.S. Pat. No. 3,758,407 issued to G. L. Harting on Sept. 11, 1973; U.S. Pat. No. 3,791,973 issued to S. Gilani et al on Feb. 12, 1974; and U.S. Pat. No. 3,929,651 issued to D. Murray et al on Dec. 30, 1975.

Another recently developed type of grease thickener is the pyrrolidone derivative as defined in U.S. Pat. No. 4,253,979 issued to A. G. Alexander et al on Mar. 3, 1981. A typical thickener of this type is a lithium pyrrolidone compound prepared from 4,4'-methylenedianiline, itaconic acid, a commercial grade amine derived from hydrogenated high erucic acid rapeseed oil (Armeen HR), lithium hydroxide and mineral oil. Other thickener types and lubricating base oils used in grease compositions may be found in "Modern Lubricatng Greases", C. J. Boner, 1976.

Additives commonly found in grease compositions may be added to the compositions prepared in accordance with the method of this invention. Such additives may include e.g. oxidation inhibitors or antioxidants, rust preventives, anti-wear agents, extreme pressure agents, pour depressants, metal deactivators, etc. Further description of additives used in greases may be found in "Modern Lubricating Greases", C. J. Boner, 1976, Chapter 5.

The following examples are set forth to further illustrate the invention and should not be construed as limitations thereof.

EXAMPLE 1

A simple lithium grease was prepared as illustrated in FIG. 2 by adding 38.0 lbs./hr. of a 12-hydroxystearic acid in oil solution (25 wt. % of acid in oil) at 82° C. (180° F.) to barrel number 1 of the continuous process unit. The lubricating oil is a Solvent 600 N mineral oil with a V.I. of 90. Also added to barrel 1 was 6.9 lbs./hr. of an 18.3% by weight solution of lithium hydroxide monohydrate in water.

The mixture was heated to 149° C. (300° F.) and then conveyed along the process unit via rotation of a twin rotating screw with the temperature controlled in the various zones as shown in FIG. 2. Temperatures noted in this and additional examples are steel surface readings rather than absolute material temperatures. The resulting mixture was dehydrated at 204° C. (400° F.) in barrels 5 and 6 with the removal of excess water. Crystallization of the soap melt then followed at the elevated temperature of 216° C. (420° F.) along with the continued homogenization and mixing of the grease mass as it was conveyed to its removal point by operation of the twin screw device. The resulting base soap had a thickener content of 27.8%. Not shown was the additional oil dilution which achieves the desired consistency. The total residence time in the continuous screw process unit was about 5 to 7 minutes and the finished grease had the following properties:

| Thickener Content | 10.4% |
|---|---|
| Penetration, mm/10, 25° C. | |
| Unworked | 275 |
| Undisturbed (48 hours) | 278 |
| Worked (60 Strokes) | 260 |
| Worked (100,000 Strokes) | 248 |
| Δ PEN, % | −4.6 |

| | |
|---|---|
| Dropping Point | 203° C./397° F. |
| Appearance | Very smooth |
| | Translucent |

The quality of this grease is equivalent to current batch production processes.

EXAMPLE 2

A complex lithium grease was prepared as illustrated in FIG. 3 by adding 8.61 lbs./hr. of solid 12-hydroxystearic acid [HSA(s)] into barrel 1 using an auger feeder. Solvent 600 N lubricating mineral oil was added (15 lbs./hr.), oil (1) immediately and the mixture heated to achieve a homogeneous solution as the material was conveyed along the process unit by operation of the twin rotating screw. In barrel 2, 7.57 lbs./hr. of an 18% by weight of lithium hydroxide monohydrate in water solution was added. A simple soap was formed and the mass heated and conveyed to barrels 4/5 (a double length barrel) where the soap stock was dehydrated. An oil wash was used in barrels 4/5 and also in barrels 6 and 9/10 and this constituted a small percentage (total of 6.5 lbs./hr.) of all the oil used. Such oil wash was sprayed or dripped into the vent and feed openings to keep the openings clean and free flowing.

The mass was cooled and 2.99 lbs./hr. of solid azelaic acid [AZA(s)] was added and mixed in at barrel 6 as it was conveyed to the end of barrel 7 where 7.44 lbs./hr. of 18% lithium hydroxide monohydrate in water solution was added to achieve saponification. The mass was conveyed with mixing into the last dehydration section, barrels 9/10, to remove free water. The soap stock was conveyed through barrels 11 and 12 where it was heated to crystallization temperatures after which it was passed through the remaining length of the process unit where additional oil, oil 2 (9 lbs./hr.), oil 3 (10 lbs./hr.) oils 4, 5 and 6 (13 lbs./hr. each) and additives (6.2 lbs./hr.) (conventional greases additive package) were added as shown. The finished grease was removed from the unit at the rate of 100 lbs./hr. and had a residence time of approximately 9 minutes. The grease had the following properties:

| | |
|---|---|
| Thickener Content | 14.3% |
| Penetration, mm/10, 25° C. | |
| Unworked | 281 |
| Worked (60 Strokes) | 289 |
| Worked (100,000 Strokes) | 326 |
| Δ PEN, % | +12.8 |
| Dropping Point | 278° C./533° F. |
| Wheel Bearing, 163° C./325° F. | |
| Leakage, g. | 2.8 |
| Slump | nil |
| Consistency | Smooth |

The quality illustrated by this grease is equivalent to current batch production and is comparable with greases of this type prepared in accordance with the disclosure of U.S. Pat. No. 3,791,793 issued Feb. 12, 1974.

EXAMPLE 3

A lithium pyrrolidone grease was prepared as illustrated in FIG. 4 by adding 3.40 lbs/hr. of solid 4,4'-methylene dianiline [MDA(s)] and 4.47 lbs./hr. of solid itaconic acid [ITA(s)] into barrel 1 using auger feeders. Solvent 600 N lubricating oil was immediately added (0.2 lbs./hr.), oil (1) and an organic condensation reaction took place to yield bispyrrolidone and water as the mass was conveyed along the process unit. Water was driven off in the vent barrels (#4/5) and 5.41 lbs/hr. of solid Armeen HR (a fatty amine derived from hydrogenated high erucic rapeseed oil) was added using an auger feeder. Additional oil, oil 2 (2.3 lbs./hr.) was also added. As the mass was conveyed through barrels 6 to 9, a second condensation reaction took place to yield a fatty monoamide. After further oil addition, oil 3 (2.6 lbs./hr.), oil 4 (2.8 lbs./hr.), oil 5A (5.3 lbs./hr.) and oil 5B (5.4 lbs./hr.), an 18% solution of lithium hydroxide monohydrate in water was added in barrel 13 to yield the final chemical structure. As the mass was conveyed through barrels 14/15, water was driven off to yield a hard homogeneous "base soap" with a thickener content of 35.4%. An oil wash was used in barrels 4/5 and 14/15 and this constituted a small portion (total of 7.0 lbs./hr.) of all the oil used in the process. This oil wash was sprayed or dripped into the vent and feed opening to keep the opening clean and free flowing. Not shown was the additional oil dilution and adding of additives (conventional grease additive package) which achieves the desired consistency. The final product had the following properties:

| | |
|---|---|
| Thickener Content | 16.5% |
| Penetration, mm/10, 25° C. | |
| Unworked | 265 |
| Worked (60 Strokes) | 265 |
| Worked (100,000 Strokes) | 351 |
| Δ PEN, % | +32.4 |
| Dropping Point | 330° C./626° F. |
| Wheel Bearing, 163° C./325° F. | |
| Leakage, g | 0.4 |
| Slump | nil |
| Consistency | Smooth. |

The quality illustrated by this grease is equivalent to current batch production and is comparable with greases of this type prepared in accordance with the disclosure of U.S. Pat. No. 4,253,979 issued Mar. 3, 1981.

The above three examples illustrate the process advantages of this invention including better quality control, improved economics derived from lower capital cost, smaller space requirements, reduced energy consumption, less waste material and most important increased flexibility for the capital equipment utilized by allowing for handling of different grease types with a minimum amount of changes. It is clear from the above description that the process utilizing the screw process unit in accordance with this invention can be readily altered to satisfy different grease types by changing the different screw elements and by altering the barrel sections with necessary inlets and outlets and varying the temperatures in the different temperature zones.

What is claimed is:

1. In the process of manufacturing a lubricating grease wherein thickener reactants, lubricating base oil and additives are combined, dispersed, reacted, dehydrated and homogenized to form the grease the improvement wherein the grease is continuously manufactured comprising:

(a) introducing thickener reactants and lubricating oil into selected locations of a screw process unit which contains a series of adjacent, longitudinally connected barrel sections for performing different operative steps and houses a rotating screw device traversing the interior of the barrel sections and having separate elements along its length to perform desired operations;

(b) mixing and conveying said reactants and lubricating oil along said process unit through the adjacent barrel sections by continuous operation of said rotating screw to form a feed mixture;

(c) controlling the temperature of said mixture while it is being conveyed through said process unit by use of various heat exchange means which are located in or adjacent each barrel to aid in carrying out the operative steps of dispersion, reaction, dehydration and homogenization;

(d) venting water resulting from the dehydration of the feed mixture at selected barrel discharge points in said process unit;

(e) homogenizing the formed grease by continued rotation of said screw device; and (f) removing the finished lubricating grease from the end barrel section of said screw process unit.

2. The process of claim 1 wherein said rotating screw device comprises a twin rotating screw.

3. The process of claim 1 wherein said rotating screw device comprises a single element screw.

4. The process of claim 1 wherein said heat exchange means comprises a passage in the barrel for carrying a heat transfer media.

5. The process of claim 4 wherein said rotating screw device is a co-rotating twin screw.

6. The process of claim 1 wherein the lubricating grease manufactured is one having a soap or pyrrolidone thickener formed in situ.

7. The process of claim 6 wherein said soap thickener is a simple lithium soap or a complex lithium soap.

8. The process of claim 7 wherein said soap thickener is a simple lithium soap prepared from 12-hydroxystearic acid, lithium hydroxide monohydrate and mineral oil.

9. The process of claim 7 wherein said soap thickener is a complex lithium soap prepared from 12-hydroxystearic acid, lithium hydroxide monohydrate, azelaic acid and mineral oil.

10. The process of claim 6 wherein said thickener is a lithium pyrrolidone compound prepared from 4,4'-methylene dianiline, itaconic acid, an amine of rapeseed oil, lithium hydroxide monohydrate and mineral oil.

11. The process of claim 1 wherein additives are introduced at downstream barel sections following the dehydration step.

12. The process of claim 11 wherein additional lubricating oil is introduced at downstream barrel sections following the dehydration step.

13. The process of claim 12 wherein said rotating screw device comprises a twin rotating screw or a single element screw.

14. The process of claim 13 wherein said heat exchange means comprises a passage in the barrel for carrying a heat transfer media.

15. The process of claim 14 wherein the lubricating grease manufactured is one having a soap or pyrrolidone thickener formed in situ.

16. The process of claim 15 wherein said soap thickener is a simple lithium soap or a complex lithium soap.

17. The process of claim 16 wherein said soap thickener is a simple lithium soap prepared from 12-hydroxystearic acid, lithium hydroxide monohydrate and mineral oil.

18. The process of claim 16 wherein said soap thickener is a complex lithium soap prepared from 12-hydroxystearic acid, lithium hydroxide monohydrate, azelaic acid and mineral oil.

19. The process of claim 15 wherein said thickener is a lithium pyrrolidone compound prepared from 4,4'-methylene dianiline, itaconic acid, an amine of rapseed oil, lithium hydroxide monohydrate and mineral oil.

* * * * *